Nov. 8, 1949 C. COOKE 2,487,221
SURGICAL HAND-PRESSURE BONE GOUGE
Filed Dec. 24, 1946
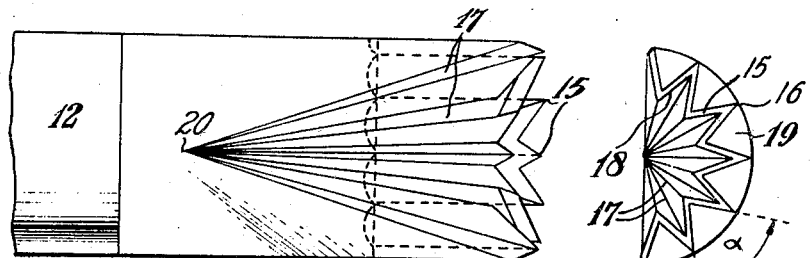
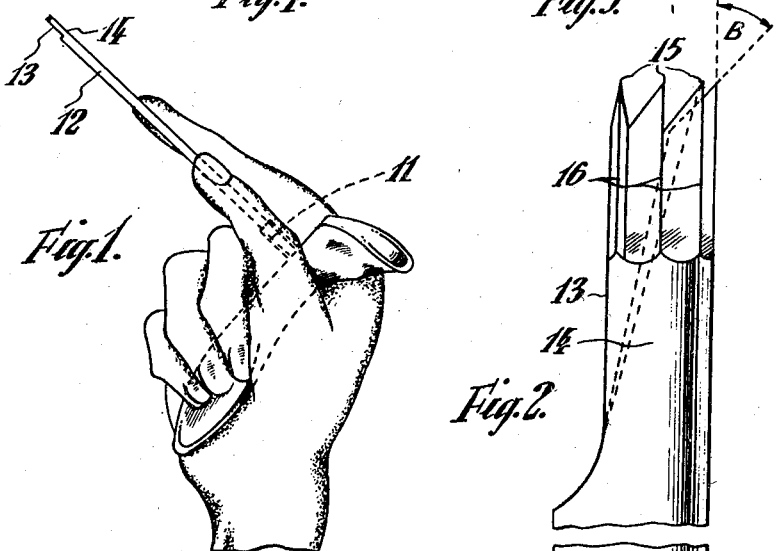
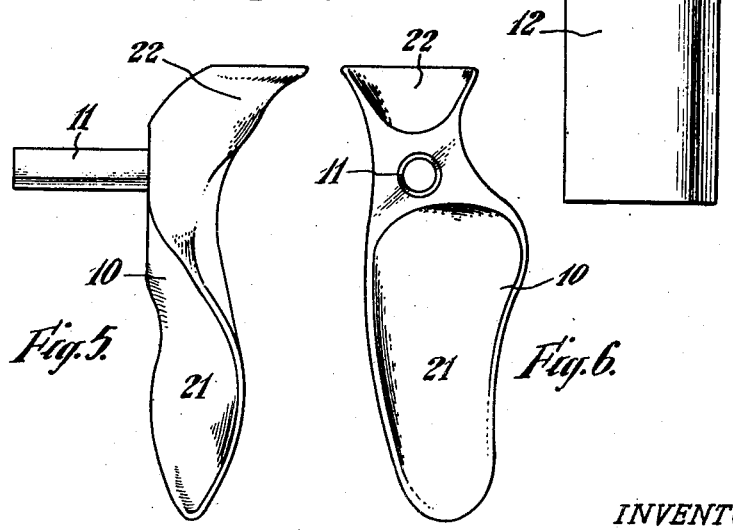
INVENTOR
CECIL COOKE
BY Richard Good
AGENT Patented Nov. 8, 1949

2,487,221

UNITED STATES PATENT OFFICE 2,487,221

SURGICAL HAND-PRESSURE BONE GOUGE

Cecil Cooke, Reading, England

Application December 24, 1946, Serial No. 718,239
In Great Britain February 27, 1942

Section 1, Public Law 690, August 8, 1946
Patent expires February 27, 1962

4 Claims. (Cl. 128—305)

This invention relates to surgical hand-pressure bone gouges.

One object of the invention is to provide a bone gouge which will cut with a forward or rotary movement and in which the bone cuttings can easily pass backwards.

A further object of the invention is to provide a bone gouge which in use provides a fine sense of touch and complete control by the hand of the user.

A further object of the invention is to provide a gouge which is noiseless in operation and is thus not objectionable to the patient.

Yet a further object of the invention is to provide a gouge which is comfortable to operate by the surgeon and by means of which all the required pressure can be conveniently applied.

In the accompanying drawings which illustrate the construction of a gouge made according to the invention:

Fig. 1 illustrates a bone cutting gouge incorporating the invention and the manner of holding it;

Fig. 2 is an enlarged elevation of the rod portion of the gouge;

Fig. 3 is an enlarged plan view looking down on the cutter end of Fig. 2;

Fig. 4 is an enlarged detail view in elevation along the inner cutting edges, and Figs. 5 and 6 are two detail views taken respectively at right angles of the handle end of the gouge.

Referring to the drawings the handle 10 of the gouge has fixed to it by welding, soldering, screwing or otherwise a short tube 11 in which is tightly fitted a steel rod 12. The free end of the rod 12 is cut away as at 13 to form a semi-cylindrical end portion 14 formed with three sets of cutting edges or teeth, namely the axially directed teeth 15 on the end of the rod, radially and outwardly directed teeth 16, and radially and inwardly directed teeth 17. The teeth 17 and 16 are formed by inner and outer longitudinal grooves 18, 19 in the end portion 14, the teeth 15 being formed by axial extensions of the teeth 16 beyond the teeth 17.

The angles α between the teeth 16 and the angle β of inward inclination of the teeth 15 may vary according to requirements. In the form described angles between 45°–49° have been found satisfactory.

Whilst the cutting edges 16 may be axially directed as shown it is preferred to cut the edges 17 at an angle and to extend their length beyond that of the edges 16 so that they meet at a point 20. This inclination of the edges 17 adds to the strength of the teeth.

The handle 10 is shaped generally to fit the hand and has a depression 21 forming a comfortable finger grip and an extension 22 to fit between the thumb and the rest of the hand, as shown in Fig. 1.

In use, the teeth 15 act during forward movement of the gouge, the pieces of bone which have been cut away escaping along the cut-away part 13. The teeth or edges 16, 17 act when the gouge is rotated. Hand pressure and semi-rotation of the gouge causes the cut bone to pass backwards easily, the cut-bone escaping from the sharp edges of the teeth down the V-shaped grooves between the teeth and through the semi-circular cut-away portion 13.

What I claim and desire to secure by Letters Patent is:

1. A hand pressure surgical bone gouge comprising a handle, a cutter-carrying stem connected at one end to said handle, said stem having its free end cut away to form an inner conical concave surface and an outer convexly curved surface, cutting teeth on said conical surface, cutting teeth on said convexly curved surface and cutting edges at the free end of said stem, the cutting teeth on said convexly curved surface extending beyond the cutting teeth on said conical surface at the free end of the stem, each cutting edge joining the apices of a tooth of each surface, said cutting teeth and edges constituting a solid cutter formed integral with the stem.

2. A bone gouge according to claim 1 in which the end of the stem carrying the cutting teeth is semi-cylindrical in cross section.

3. A bone gouge according to claim 1 in which the cutting teeth formed on said inner surface are inclined to the axis of the stem so that they meet at a common point.

4. A bone gouge according to claim 1 in which the cutting teeth on said outer and inner surfaces are formed by V-shaped grooves.

CECIL COOKE.

REFERENCES CITED

The following references are of record in the file of this patent:

UNITED STATES PATENTS

| Number | Name | Date |
|---|---|---|
| 385,088 | Benzie | June 26, 1888 |
| 651,921 | De Vilbiss | June 19, 1900 |
| 1,438,168 | Brown | Dec. 12, 1922 |

OTHER REFERENCES

The British Journal of Surgery for 1937–38, vol. 25, page 734, Catalog of the Kny-Scheerer Co. 404 W. 27th Street, N. Y., N. Y., seventeenth edition, page 2068. (Copies of the above publications in Div. 55.)